United States Patent [19]

Tajima

[11] Patent Number: 4,576,847

[45] Date of Patent: Mar. 18, 1986

[54] THREADED FIBER-REINFORCED PLASTIC MEMBER AND METHOD OF COATING THE SAME

[75] Inventor: Isao Tajima, Nara, Japan

[73] Assignee: Asahi Kasei Kogyo Kabushiki Kaisha, Osaka, Japan

[21] Appl. No.: 670,896

[22] Filed: Nov. 13, 1984

[30] Foreign Application Priority Data

Nov. 14, 1983 [JP] Japan .................................. 58-213803

[51] Int. Cl.$^4$ ............................ B44C 1/26; B05D 3/02
[52] U.S. Cl. ........................................ 428/67; 411/411; 411/436; 411/901; 411/908; 411/914; 427/389.8

[58] Field of Search .................. 428/67; 411/411, 436, 411/901, 908, 914; 427/389.8, 389.7, 393.5

Primary Examiner—Thurman K. Page
Attorney, Agent, or Firm—Birch, Stewart, Kolasch & Birch

[57] ABSTRACT

A threaded member made of fiber-reinforced plastic (FRP) obtained by the present invention which is characterized by having at least the threaded portion coated with a crosslinked nylon resin. Accordingly, the surface of the threaded portion is smooth, exhibiting adequate elasticity and fitness, and exhibiting excellent screwing ability to enable the smooth meshing of a nut with a bolt without jolting. Moreover, the threaded member is also excellent in weathering resistance and chemical resistance.

11 Claims, 2 Drawing Figures

THREADED FIBER-REINFORCED PLASTIC MEMBER AND METHOD OF COATING THE SAME

BACKGROUND OF THE INVENTION

1. Field of the Invention

The present invention relates to a threaded member such as a bolt or nut made of fiber-reinforced plastic (FRP) having excellent screwing ability and to a method of producing the same. When the bolt and nut are screwed together, they are capable of being meshed smoothly with each other without shaking or jolting which may be caused if the bolt and nut do not have adequate fitness with respect to each other. They also have excellent weathering resistance and chemical resistance.

2. Description of the Prior Art

At the present time, threaded members such as a bolt or a nut made of FRP are endowed with corrosion resistance and electric insulating properties and are utilized to secure portions which are readily corroded, such as portions of chemical equipment and marine structures or portions which must be electrically insulated, such as in heavy electrical machines or electric trams. When the threaded surface of a threaded member made of FRP is formed by cutting, as compared with a metallic threaded member, it has inadequate fitness, inferior screwing accuracy and inferior weathering resistance and chemical resistance. Because the worked cut surface may be slightly exposed, a liquid such as water will readily penetrate into voids in the exposed cut surface which are formed near the glass reinforcing fibers. Further, short strips of glass fibers exposed on the cut surface may attach to the skin of human workers and cause irritation of the skin and an itching sensation. There has been a great need to solve these problems.

SUMMARY OF THE INVENTION

The present invention solves the above problems by coating at least the threaded portion of a threaded member with a crosslinkable nylon resin and thereafter crosslinking the coating.

A first object of the present invention is to provide a bolt and a nut which have excellent screwing ability when they are screwed with each other whereby adequate fitness is possessed and they can be meshed smoothly with each other without jolting.

A second object of the present invention is to enhance the weathering resistance and chemical resistance of a threaded member.

For accomplishing such objects of the present invention, at least the threaded portion of a threaded member made of FRP must be coated with a crosslinkable nylon resin and the coating must then be crosslinked.

For obtaining such a threaded member, it is necessary to coat at least the threaded portion of a threaded member made of FRP, such as a bolt or a nut, with a solution of a crosslinkable nylon resin in an alcoholic solvent. The resin is cured by heating, thereby crosslinking and coating the threaded portion with the crosslinkable nylon resin.

DESCRIPTION OF THE PREFERRED EMBODIMENTS

Figure 1:
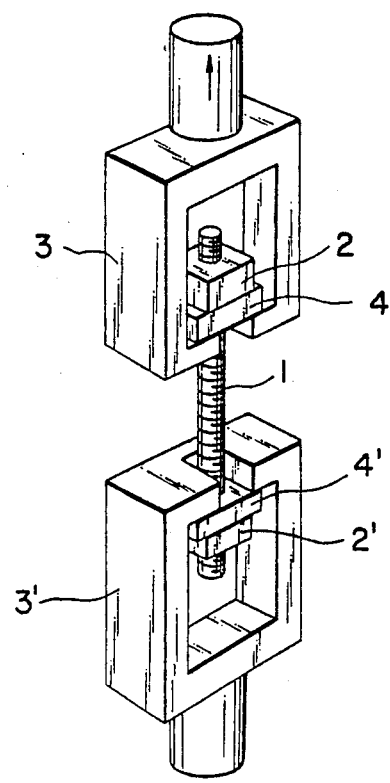
FIG. 1 is a schematic perspective view of an apparatus used for measuring the tensile strength of a threaded member.

Referring now to specific embodiments, the present invention will be described in detail.

A unique feature of the threaded member of the present invention is that the threaded portion is formed of a resin such as an epoxy resin with fiber glass and at least the threaded portion is coated with a crosslinkable nylon resin and the coating is crosslinked. Accordingly, when the uneven cut surface of the threaded portion is covered with the resin, the resin surface becomes smooth and moreover the surface exhibits adequate elasticity due to the characteristics of the nylon resin, whereby a nut and a bolt can be meshed smoothly with each other without jolting to exhibit excellent screwing ability. Further, the film formed by the resin can prevent penetration of liquid into the voids between the resin, such as epoxy resin, and the fiber glass fibers, which constitute the threaded member, whereby additional effects of enhancement of weathering resistance and chemical resistance on the threaded worked surface can also be brought about.

Next, the method for producing the threaded member made of FRP of the present invention is explained. First, a threaded member made of FRP, such as a bolt or a nut, is coated with a solution of a crosslinkable nylon resin in an alcoholic solvent by dipping, spraying or brush coating. The coating is usually applied by dipping, but special parts such as the internal portion of threaded holes may be coated by spray coating. Brush coating may also be utilized for partial coating of a threaded surface.

The crosslinkable nylon resin which can preferably be used in the present invention may include methoxymethylated polyamides, for example, methoxymethylated nylon 6 in which about 30 mol % of the hydrogen atoms of the amide groups of the nylon resin are substituted by methoxymethyl groups. Nylon 8 may also be used. Such a methoxymethylated nylon 6 resin is dissolved in a lower alcohol to prepare a solution of a nylon resin in an alcoholic solvent. The concentration of the solution may be controlled depending on the size (diameter) of the threaded member to be coated with the solution. For example, about 10 wt. % of a solution is employed for a threaded member of 10 mm in diameter, about 15 wt. % for a threaded member of 12 mm in diameter and about 20 wt. % for a threaded member of 16 mm in diameter. By applying coatings of the solution controlled to such various concentrations according to the sizes of the threaded member, the thickness of the crosslinked nylon resin applied on the surface of the threaded member, particularly the ridges and valleys of a bolt or nut can be maintained uniform.

It is also necessary to add an organic acid into the solution of the crosslinkable nylon resin to promote crosslinking of the nylon resin to the surface of the threaded member. Such organic acids may include citric acid, itaconic acid, adipic acid, succinic acid, maleic acid, hypophosphoric acid and others.

Further, if desired, the threaded member made of FRP can be colored by dissolving a dye or a pigment in the solution of the crosslinkable nylon resin. In particular, an alcohol-soluble acidic dye (e.g., KAYASET-BLACK, produced by Nippon Kayaku K.K.) can preferably be used as the dye since it has good solubility in the solution and exhibits a brilliant tone.

Since some "tackiness" remains in the threaded member made of FRP coated with the above solution of the crosslinkable nylon resin, it is dried in air until it is tack-free. The drying conditions may vary depending on the size (diameter) of the threaded member. Usually, the coated member is dried for about 20 to 40 minutes generally at a room temperature of 20° C. After drying in air, the threaded member made of FRP is subjected to preliminary drying. The preliminary drying conditions, which may vary depending on the size (diameter) of the threaded member, may be, for example, about 20 minutes at a temperature of 70° to 80° C.

After such a preliminary drying, curing is performed. The curing conditions may differ depending on the size (diameter) of the threaded member, but curing is preferably conducted by dry heating at a temperature range of from 120° to 160° C. for about 15 to 40 minutes, more preferably at 145° to 155° C. for about 30 minutes. If the curing temperature is lower than 120° C., sufficient crosslinking of the nylon resin to the threaded member may not be achieved, whereby the coated film may drop-off thereby resulting in a whitish appearance of the product. Adequate elasticity and fitness as well as weathering resistance and chemical resistance may also be impaired. If the curing temperature exceeds 160° C., the strength of a resin such as an epoxy resin constituting the threaded member may be undesirably deteriorated.

The threaded member made of FRP coated on the surface of the threaded portion with a crosslinkable nylon resin under the conditions described above can form firm methylene bonds between the molecules on its surface, thus forming a coated film of crosslinked nylon resin having a crosslinked, insoluble and infusible three-dimensional structure. The coated film is insoluble in organic solvents and is stable at high temperatures.

As a consequence, the threaded member made of FRP according to the present invention has a smooth surface, exhibits adequate elasticity to create adequate fitness at the screwed portion, thus exhibiting excellent screwing ability which enables smooth meshing of a nut with a bolt without causing jolting or shaking.

EXAMPLES

The present invention is described in more detail by referring to the following Examples.

Methods for measurement of tensile strength and torque strength:

The tensile strength and the torque strength are highly related to the screwing ability of a bolt and nut, and can be used as a measure of the screwing ability. In other words, the bolt and the nut, having adequate elasticity and fitness, which can be meshed smoothly with each other without jolting, are in a state where most of the ridges and valleys of the threads contact each other, thereby dispersing the load applied to the bolt and the nut. Accordingly, the nut and the bolt of the present invention exhibit higher tensile strength and torque strength, as compared with a bolt and a nut having poor screwing ability accompanied with jolting.

The methods for measuring respective strengths are described below.

(1) Measurement of tensile strength:

With respect to the nuts and the threads of the bolts the tensile strength was measured using the testing device shown in FIG. 1. The method of measuring the tensile strength will be briefly explained below by referring to FIG. 1. A load cell (not shown) is provided above an upper jig 3. Both the jigs 3 and 3' are pulled in opposite directions so that a pulling force is applied to a bolt 1 and to nuts 2 and 2' (same units) through steel spacer 4 and 4'. The pulling force is increased until the threads of one or each of the nuts or the threads of the bolts are crushed or the bolt body is broken. The load at which the crushing of the threads of one or each of the nuts or the threads of the bolts or the breaking of the bolt body occurs is measured by means of the load cell. The value of this tensile strength is expressed as the arithmetic mean value of 5 measured values.

(2) Measurement of torque strength

Figure 2:
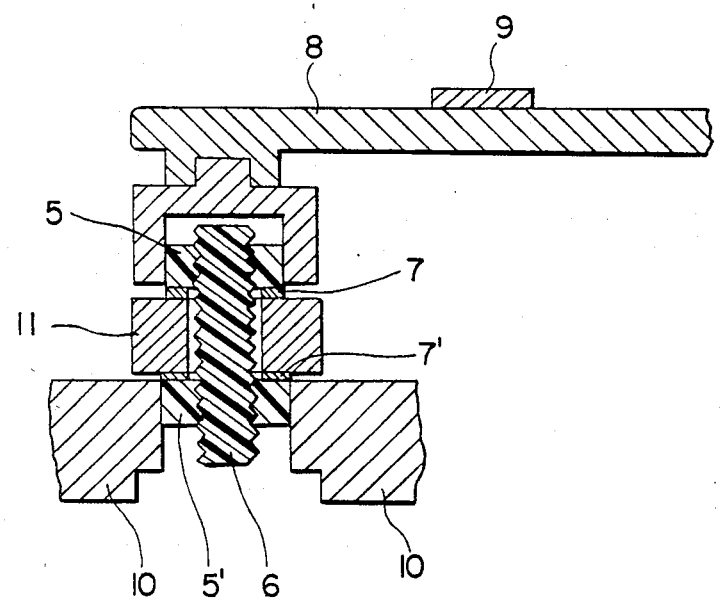
FIG. 2 is a cross-sectional view of an apparatus used for measuring the torque strength of a threaded member.

With respect to the nuts and the threads of the bolts the torque strength was measured using the testing device shown in FIG. 2. The method of measuring the torque strength will be briefly explained below with reference to FIG. 2.

Two nuts (same nuts) 5 and 5' to be examined are screwed on both end portions of a M12 bolt 6 to be examined (pitch: 1.75 mm), with a pair of washers 7 and 7' provided thereunder. Numeral 11 designates a spacer. The nut 5 is tightened by a torque wrench 8, while the nut 5' is fixed by a vice 10. Torque is increased until the thread of one or each of the nuts 5, 5' or the bolts 6, is broken, and the torque at which the thread is broken is measured by a torque meter 9. The torque strength is defined as the torque at which breaking of the thread of one or each of the nuts or the thread of the bolts occurs. The value of this torque strength is expressed as the arithmetic mean value of 5 measured values.

EXAMPLES 1-2

Two kinds of bolts made of FRP comprising an epoxy resin reinforced with fiber glass, having diameters of 12 mm and 16 mm, respectively, and pitches corresponding thereto of 1.75 mm and 2.0 mm, respectively, and two kinds of nuts screwed with these bolts were prepared. Surface adherents on these bolts and nuts such as contaminants and glass powder were removed so that no trouble in adhesion of the resin to the surface would occur.

Separately, a methoxymethylated nylon 6 resin (trade name: Fine Resin FS 300, produced by Namariichi K.K.) was prepared and the nylon resin was dissolved in a 99% methanol for industrial use to prepare solutions with resin concentrations of 15 wt. % and 20 wt. %, respectively. The solutions were heated to about 60° C. in order to accelerate dissolution of the nylon resin.

For coloration of the solutions, a dye solution of an alcohol-soluble acidic dye KAYASET-BLACK produced by Nippon Kayaku K.K. was dissolved separately in an alcohol and was mixed in each of the above solutions of crosslinkable nylon resins, followed by thorough stirring.

Further, into the colored solution of the crosslinkable nylon resin, 5 wt. % of citric acid (50% aqueous solution) based on the above nylon resin was added as the catalyst, followed by stirring. Each of the thus prepared 15 wt. % and 20 wt. % solutions of the crosslinkable nylon resin was uniformly applied on the previously prepared bolts and nuts of 12 mm and 16 mm in a diameter by the dipping method.

After drying in air at a room temperature of 20° C. for 30 minutes, the coated product was dried preliminarily at 75° C. for 20 minutes. Then, curing was effected under dry heating at 150° C. for 30 minutes.

When the two kinds of bolts and nuts of 12 mm and 16 mm in diameter were screwed with each other, respectively, they had adequate elasticity and fitness and also exhibited excellent screwing ability, with smooth meshing between the nut and the bolt without jolting. A measure of the screwing ability, tensile strength and torque strength are shown in Table 1 together with an evaluation of the feeling by touch.

COMPARATIVE EXAMPLES 1-2

When the same kinds of bolts and nuts as employed in the above Examples 1 to 2, having diameters of 12 mm and 16 mm, respectively, which had not been subjected to coating were screwed with each other, respectively, meshing between these bolts and nuts was poor with respect to elasticity and fitness, with the occurrence of jolting, thus giving a very bad screwing ability. Table 1 shows the results of tensile strength and torque strength together with the evaluation of the feeling by touch.

COMPARATIVE EXAMPLE 3

The uncoated bolts and nuts of the same kind as employed in Examples 1 to 2 having a diameter of 12 mm were coated with a mixture of an epoxy resin (produced by Dainippon Shikizai Kogyo K.K.; #M4040-R) and a curing agent (produced by Dainippon Shikizai Kogyo K.K.; #M4040) by dipping the bolts and nuts in the mixture immediately after mixing the resin with the curing agent at a weight ratio of 10:3. The nuts and bolts were then cured at 60° C. for 2 hours. When the bolt and the nut thus obtained were screwed with each other, the surfaces were smooth, but devoid of elasticity or fitness, and they could be fastened together only with the unpleasant generation of a squeaking sound. A measurement of the screwing ability, tensile strength and torque strength are shown in Table 1 together with an evaluation of the feeling by touch.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A threaded member, comprising a threaded member made of fiber reinforced plastic and a coating of a crosslinked nylon resin on at least the threaded portion of the threaded member.

2. The threaded member according to claim 1, wherein the crosslinked nylon resin is a methoxymethylated nylon 6 resin.

3. The threaded member according to claim 1, wherein the fiber-reinforced plastic comprises an epoxy resin reinforced with fiber glass.

4. The threaded member according to claim 3, wherein the threaded portion is formed by cutting threads into the fiber-reinforced plastic.

5. The threaded member according to claim 4, which is a nut.

6. The threaded member according to claim 4, which is a bolt.

7. A method for producing a threaded member made of fiber-reinforced plastic, which comprises coating at least the threaded worked portion of a member made of fiber-reinforced plastic with a solution of a crosslinkable nylon resin in an alcoholic solvent, and curing the resin thereby to coat the member with a crosslinked nylon resin.

8. The method according to claim 7, wherein the crosslinkable nylon resin is a methoxymethylated nylon 6 resin.

9. The method according to claim 8, wherein the alcoholic solvent is methanol or ethanol.

10. The method according to claim 9, wherein curing by heating is conducted at a temperature range of from

TABLE 1

| | Material | Coated resin | Diameter of bolt | Dimension of bolt | Dimension of nut | Tensile strength Kg | Torque strength Kg-cm | Screwing ability by feel of touch |
|---|---|---|---|---|---|---|---|---|
| Example 1 | FRP | Nylon resin | 12 | 100L × P1.75 | 18t × 22 | 1544 | 323 | Good |
| Example 2 | FRP | Nylon resin | 16 | 200L × P2 | 20t × 30 | 2227 | 638 | Good |
| Comparative Example 1 | FRP | none | 12 | 100L × P1.75 | 18t × 22 | 1372 | 285 | Bad with jolting |
| Comparative Example 2 | FRP | none | 16 | 200L × P2 | 20t × 30 | 1856 | 564 | Bad with jolting |
| Comparative Example 3 | FRP | Epoxy resin | 12 | 100L × P1.75 | 18t × 22 | 1398 | 300 | Bad with squeaking |

Note:
The bolt dimension of, for example, 100L × P1.75 means a bolt length of 100 mm and a pitch length of 1.75 mm; the nut dimension of, for example, 18t × 22 means a nut thickness of 18 mm and one side length of square nut of 22 mm.

From the above results, it can be seen that the threaded member made of FRP according to the present invention (Examples 1-2) has adequate elasticity or fitness to give excellent screwing ability with smooth meshing between a bolt and nut without jolting.

120° to 160° C. for about 15 to 40 minutes.

11. The method according to claim 7, wherein an organic acid is added into the solution of the crosslinkable nylon resin.

* * * * *